(12) United States Patent
Koch et al.

(10) Patent No.: US 7,493,811 B2
(45) Date of Patent: Feb. 24, 2009

(54) POSITIVE DISPLACEMENT METER SEAL SCHEME

(75) Inventors: Ronald N. Koch, Sewickley, PA (US); James L. Rogers, Irving, TX (US)

(73) Assignee: Master Meter, Inc., Mansfield, TX (US)

( * ) Notice: Subject to any disclaimer, the term of this patent is extended or adjusted under 35 U.S.C. 154(b) by 0 days.

(21) Appl. No.: 11/328,740

(22) Filed: Jan. 10, 2006

(65) Prior Publication Data

US 2006/0225498 A1   Oct. 12, 2006

Related U.S. Application Data

(60) Provisional application No. 60/690,054, filed on Jun. 10, 2005, provisional application No. 60/644,392, filed on Jan. 14, 2005.

(51) Int. Cl.
*G01F 3/14* (2006.01)
(52) U.S. Cl. ........................................... 73/239
(58) Field of Classification Search ................... 73/239
See application file for complete search history.

(56) References Cited

U.S. PATENT DOCUMENTS 3,166,332 A * 1/1965 Olson ......................... 277/644
3,693,986 A * 9/1972 Lambie ....................... 277/638
4,512,201 A * 4/1985 Konrad et al. .............. 73/861.79
4,715,609 A * 12/1987 Mino et al. .................. 277/608
5,275,043 A * 1/1994 Cotton ......................... 73/261
5,964,408 A * 10/1999 Musson ....................... 239/123
6,361,049 B1 * 3/2002 Joco ............................ 277/312
6,921,089 B2 * 7/2005 Groh et al. ................... 277/628

* cited by examiner

*Primary Examiner*—Harshad Patel
(74) *Attorney, Agent, or Firm*—The Webb Law Firm (57) ABSTRACT

A positive displacement water meter includes a measuring chamber having an outlet port defined therein, wherein the outlet port includes a channel defined around the outlet port. A seal includes a planar surface and a curved surface, wherein the planar surface is substantially parallel to the curved surface, and the planar surface is situated within the channel. A meter casing includes an outlet port defined therein, wherein the meter casing receives the measuring chamber therein such that the outlet port of the measuring chamber is substantially aligned with the outlet port of the meter casing. The curved surface of the seal abuts a periphery of the outlet port of the meter casing forming a seal therewith. Due to the substantially arcuate cross section, the seal is adapted to resist the dislodging thereof from the channel during assembly of the positive displacement water meter.

11 Claims, 10 Drawing Sheets

POSITIVE DISPLACEMENT METER SEAL SCHEME

CROSS REFERENCE TO RELATED APPLICATIONS

This application claims the benefit of U.S. Provisional Patent Application No. 60/644,392, filed Jan. 14, 2005, and U.S. Provisional Patent Application No. 60/690,054, filed Jun. 10, 2005, both entitled "PD Meter Seal Scheme", the contents of which are incorporated herein by reference.

BACKGROUND OF THE INVENTION

1. Field of the Invention

The present invention relates generally to a seal and, more particularly, to a seal for use in a positive displacement meter.

2. Description of Related Art

Positive displacement water meters and water meters in general, have several criteria that must be met. They must be accurate and they must be able to function in various temperatures. Debris floating in the water, be it rust or other objects, can affect the operation of water meters, particularly positive displacement meters. Hence, all positive displacement meters include at least a filter screen preferably positioned forwardly of the positive displacement meter chamber. In many instances, the positive displacement meter chamber must be held between a gasket and meter body. If the meter chamber is compressed too tightly, it will affect accuracy of the meter and may cause the measuring chamber piston to bind. Further, in many instances, the meters may be placed in cold environments where the water will freeze. This can typically happen in a home where the heat is shut off. In that case the meter body may be damaged. To minimize this effect, meter bottom plates are provided made of cast iron or plastic. However, if the cast iron meter bottom plate does not fail at the appropriate time, the meter casing and measuring chamber will be damaged.

Additionally, an outlet port is defined within the measuring chamber of the positive displacement water meters. The outlet port typically abuts a meter casing of the positive displacement meter with a seal situated therebetween. However, the design of prior art seals allows the seals to become loose and dislodge during the assembly of the meter. Further, the prior art seals leaked due to pressure pulses and back syphonage during the meter operation.

Therefore, it is an object of the present invention to provide a meter to overcome the deficiencies of the prior art.

SUMMARY OF THE INVENTION

It is, therefore, an object of the present invention to provide a seal for use in a positive displacement meter seal. The seal includes three or more legs formed as a geometric frame arrangement (e.g., substantially rectangular), wherein each leg includes a first, second, third, and fourth side. The fourth side includes a raised portion extending therefrom having a substantially arcuate-shaped cross section.

The raised portion extends continuously along the fourth side of each respective leg. The first, second, and third sides of each respective leg are substantially flat. The raised portion is situated in a substantially central portion of the fourth side of each respective leg to form a ledge thereon.

A positive displacement water meter includes a measuring chamber having an outlet port defined therein, wherein the outlet port includes a channel defined around the outlet port. The positive displacement water meter also includes a seal having a planar surface and a curved surface, wherein the planar surface is substantially parallel to the curved surface, and the planar surface is situated within the channel. The positive displacement water meter further includes a meter casing having an outlet port defined therein, wherein the meter casing receives the measuring chamber therein such that the outlet port of the measuring chamber is substantially aligned with the outlet port of the meter casing. The curved surface of the seal abuts a periphery of the outlet port of the meter casing forming a seal therewith. Due to the substantially arcuate cross section, the seal is adapted to resist the dislodging thereof from the channel during assembly of the positive displacement water meter.

These and other advantages of the present invention will be understood from the description of the preferred embodiments, taken with the accompanying drawings, wherein like reference numerals represent like elements throughout.

DETAILED DESCRIPTION OF THE INVENTION

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific components illustrated in the attached drawings, and described in the following specification, are simply exemplary embodiments of the invention.

Hence, specific dimensions and other physical characteristics related to the embodiments disclosed herein are not to be considered as limiting.

FIGS. 1-5 show various views of a meter casing 100 of a meter M. The meter M includes a meter casing 100, a measuring chamber 150, a bottom plate 200, and a screen 250. The measuring chamber 150 is a positive displacement measuring chamber that includes a piston P.

Figure 1:
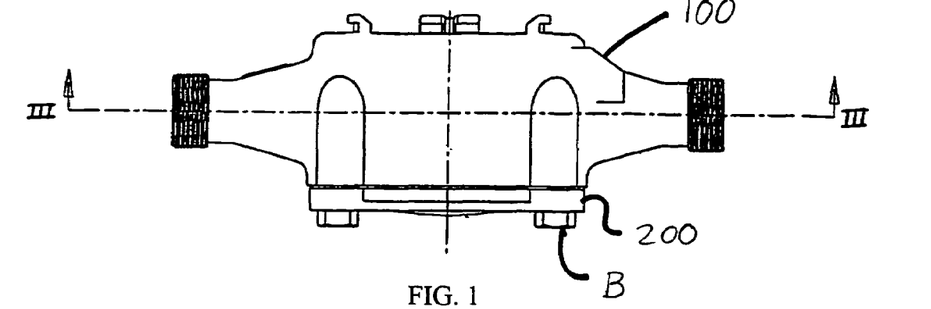
FIG. 1 is a front plan view of a meter casing for a water meter.
Figure 2:
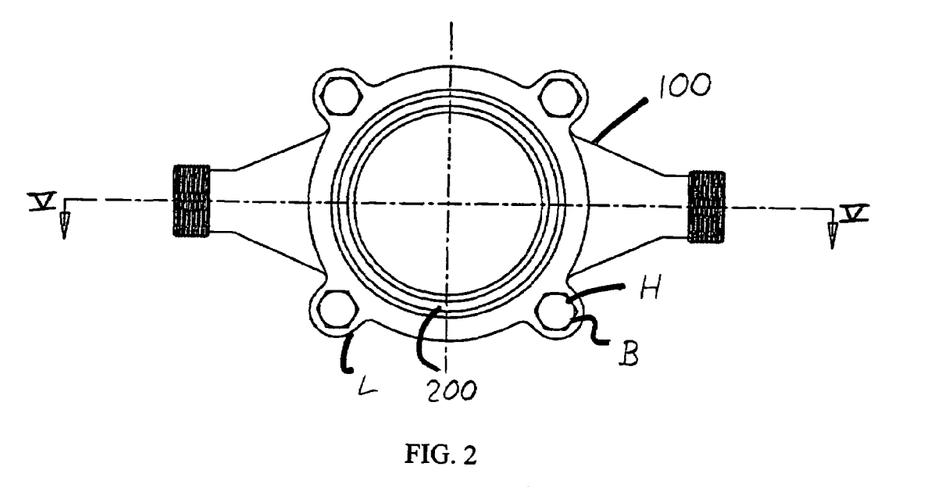
FIG. 2 is a top plan view of the meter casing of FIG. 1.
Figure 3:
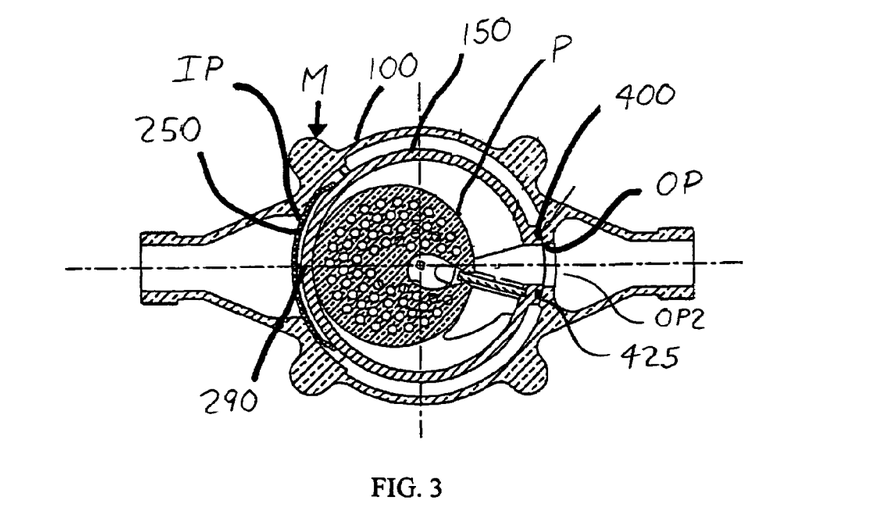
FIG. 3 is a sectional view of the meter casing taken along the lines III-III of FIG. 1.
Figure 4:
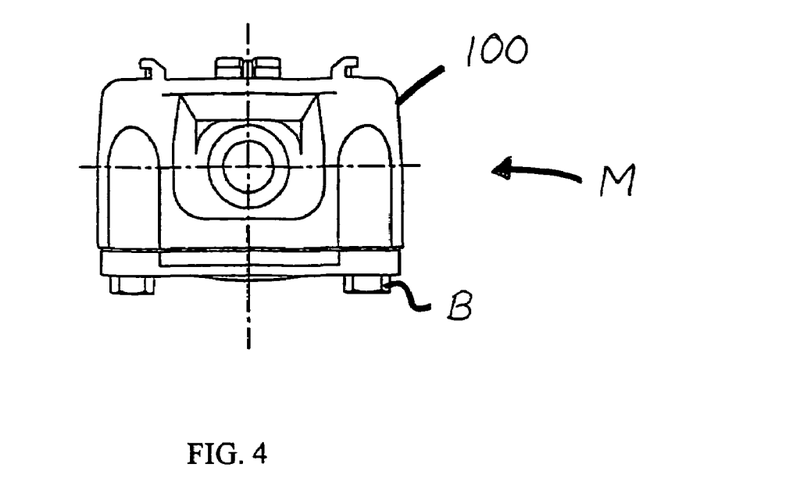
FIG. 4 is a side plan view of the meter casing.
Figure 5:
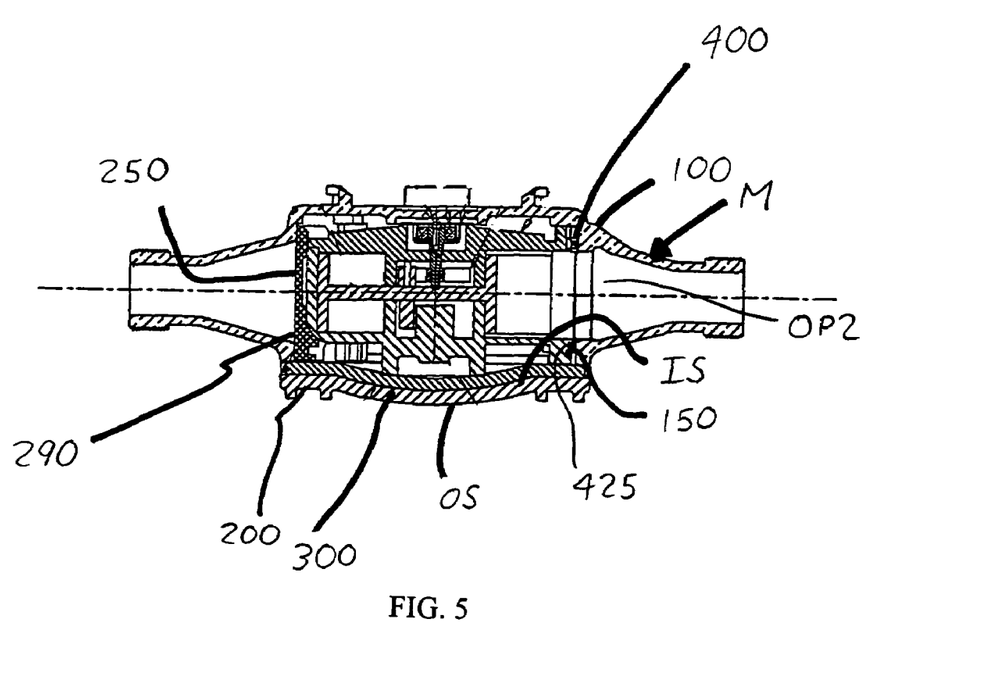
FIG. 5 is a sectional view of the meter casing taken along the lines V-V of FIG. 2.
Figure 6:
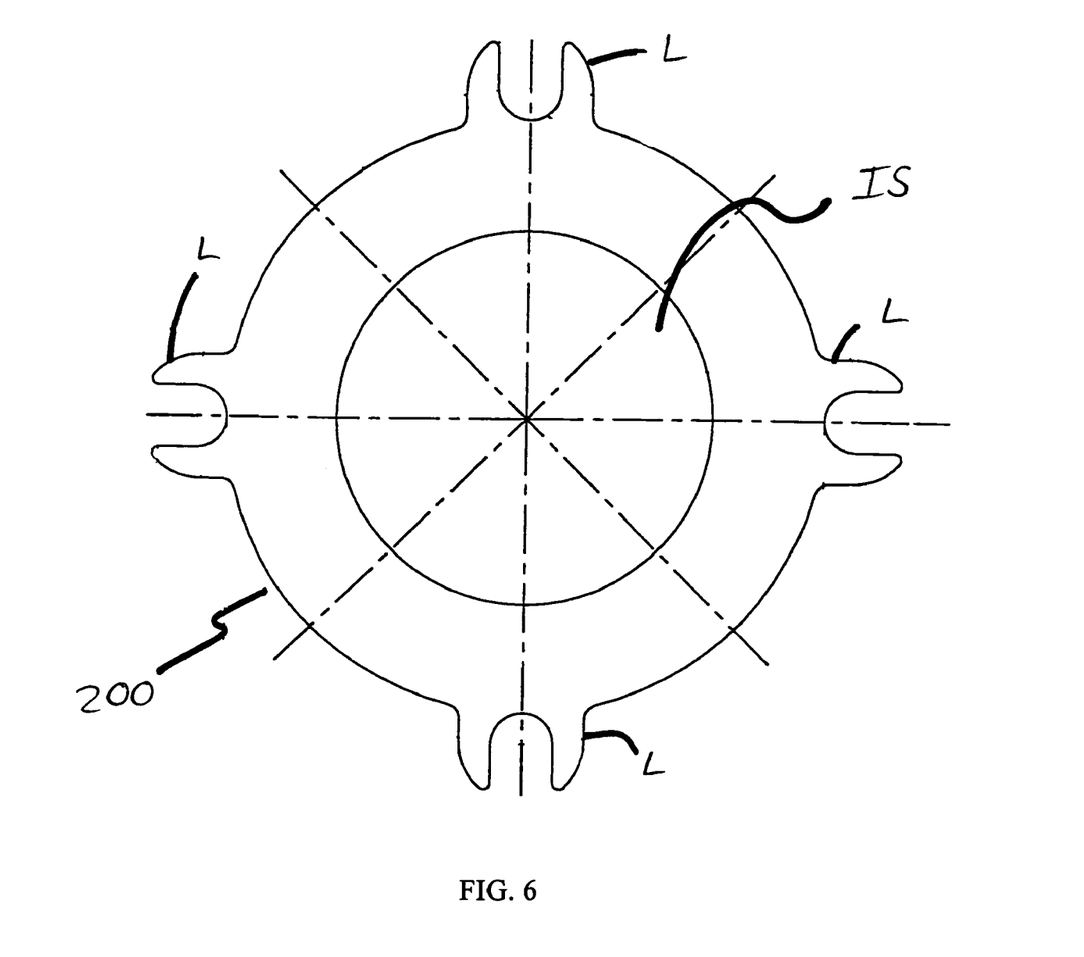
FIG. 6 is a top plan view of a bottom plate of the meter casing.
Figure 7:
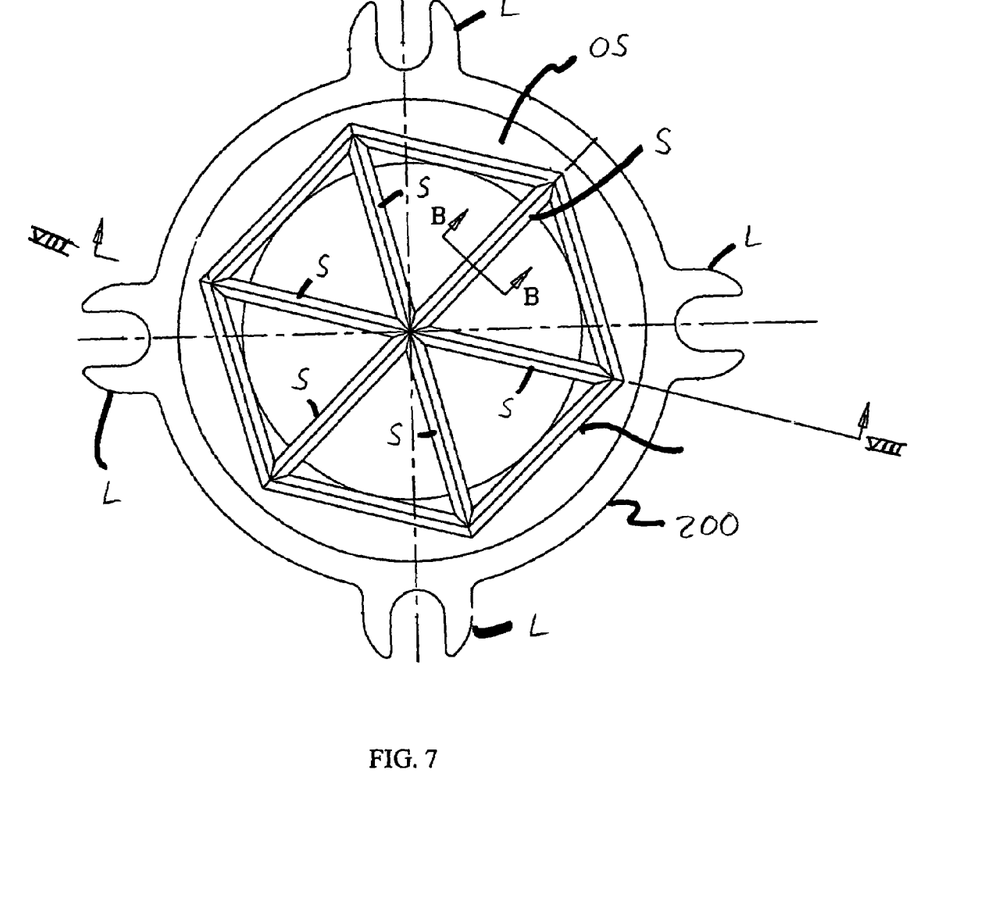
FIG. 7 is a bottom plan view of the bottom plate.
Figure 8:
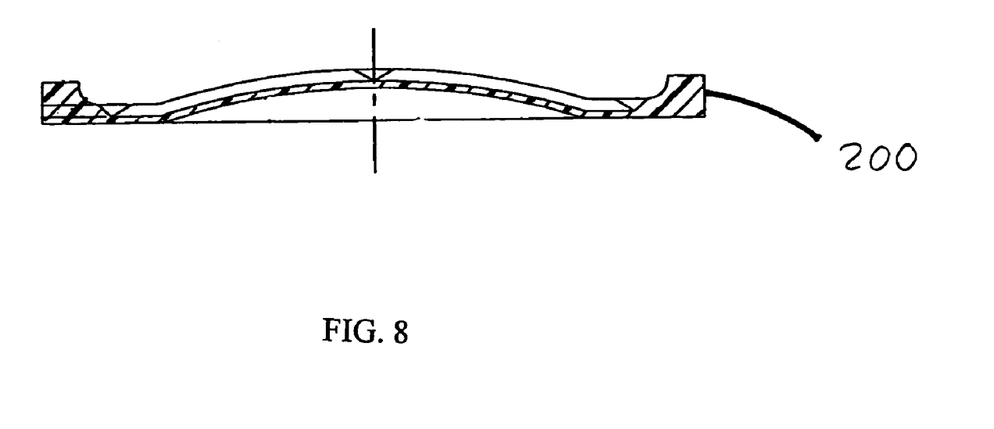
FIG. 8 is a sectional view taken along lines VIII-VIII of FIG. 7.
Figure 9:
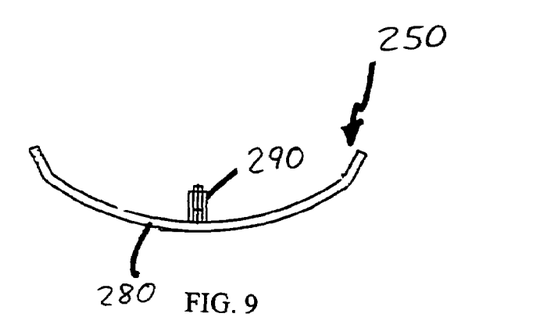
FIG. 9 is a top plan view of a screen for use in the water meter.
Figure 10:
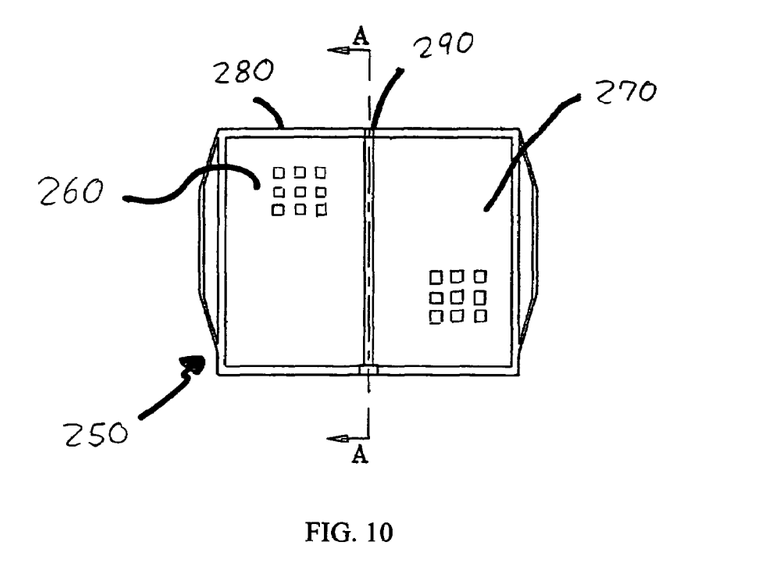
FIG. 10 is a side plan view of the screen of FIG. 9.
Figure 11:
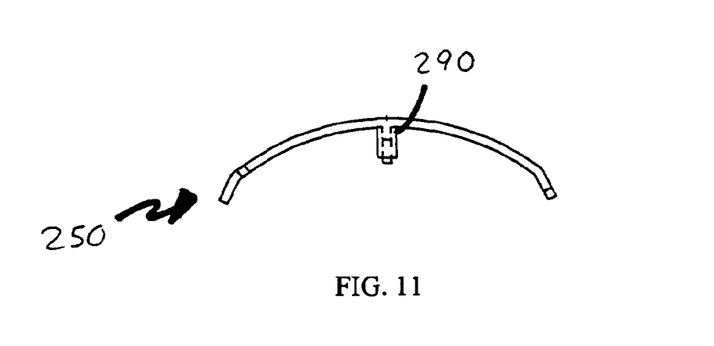
FIG. 11 is a top plan view of the screen.

The bottom plate 200 is preferably made of cast iron and is attached to the meter casing 100 via bolts B. FIGS. 6-8 show various views of the bottom plate 200. The bottom plate 200 is substantially circular in shape and includes four lugs L for receiving bolts or fasteners. Bolt heads rest on lug surfaces as shown in FIGS. 1-3. Also, an outer surface OS of the plate 200 defines a hexagonal recess H having six segments S extending from intersection points towards the center of the plate 200. The segments S and hexagon H are defined by V-shaped grooves and create stress concentrations on the bottom plate 200. Hence, when the plate is pressurized from the inner surface outwardly, the stress concentrations formed on the bottom plate 200 at the hexagon H and segments S cause the plate to crack or fail at an appropriate pressure, such as for example, 450 psi, or when the water contained within the meter begins to freeze. Once the plate 200 cracks or fails due to a stress concentration, the internal pressure is relieved in the water plate to prevent damage to the meter casing and the measuring components. It is to be understood that the stress concentration forming shape, that is the hexagonal recess H and segments S, may take many forms. Preferably, the forms are in the shape of a polygon with segments extending from the intersection points of the polygon to the center thereof.

Figure 12:
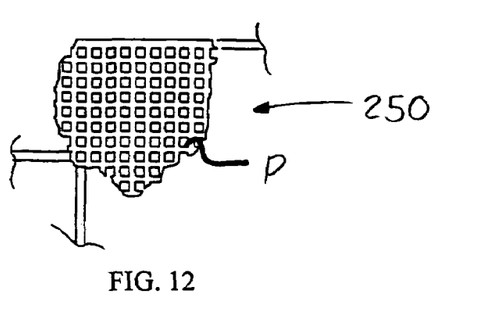
FIG. 12 is a partial detailed view of the side of the screen of FIG. 10.
Figure 13:
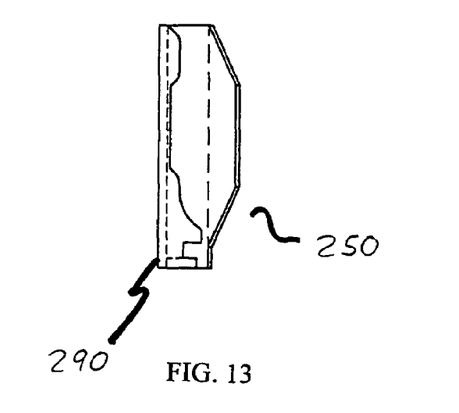
FIG. 13 is a left side view of the screen.
Figure 14:
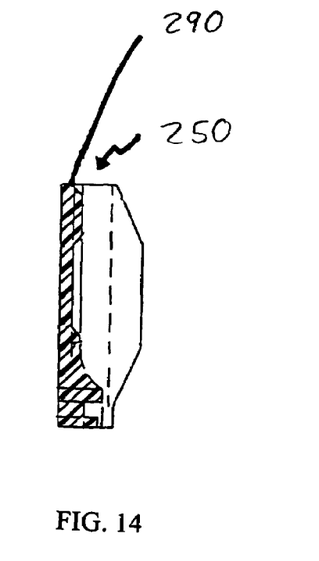
FIG. 14 is a right side view of the screen.

Referring to FIGS. 9-14, the present invention also includes the screen 250 for use with a water meter. Preferably, the screen 250 is made of plastic and includes perforation sections 260 and 270. The sections 260 and 270 are provided on an arcuate portion 280. It is to be understood that the detailed view of the screen 250 shown in FIG. 12 is to be applied to the sections 260 and 270 of FIG. 10. The center of the screen 250 includes an axially extending rib 290.

The screen 250 is provided to extend over an inlet portion IP of the meter body, as shown in FIG. 3. Further, a centrally positioned rib 290 is provided to be sandwiched between a meter gasket 300 and meter casing 100. Hence, when the bottom plate 200 is fastened, or tightened, against the meter casing 100, the centrally positioned rib 290 acts as a support so that the measuring chamber 100 is not squeezed by the plate 200 so as to cause binding of the piston P.

Figure 15:
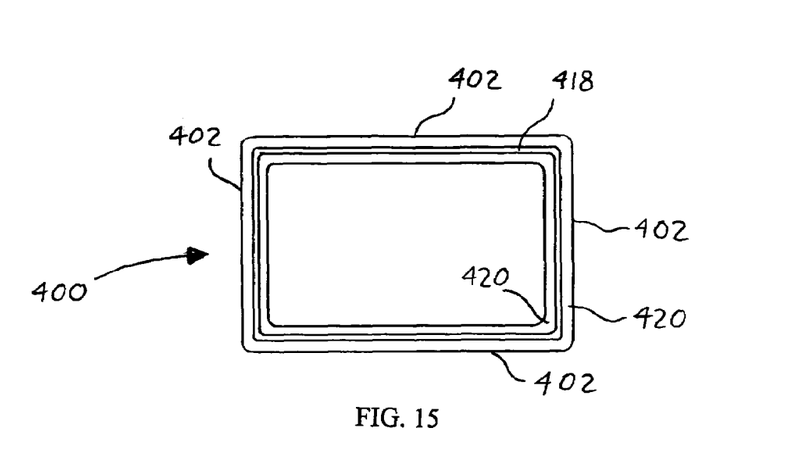
FIG. 15 is a top plan view of a seal for use with the water meter.
Figure 16:
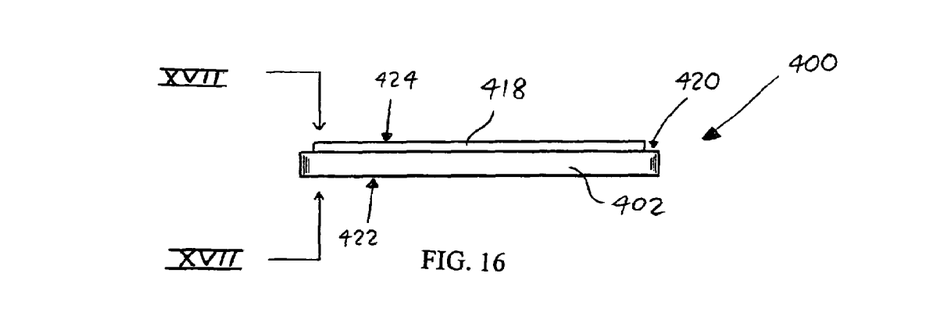
FIG. 16 is a side plan view of the seal of FIG. 15.
Figure 17:
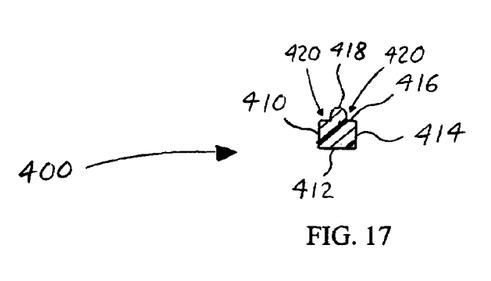
FIG. 17 is a sectional view of the seal taken along lines XVII-XVII of FIG. 16.

Furthermore, the present invention includes a sealing ring 400, as shown in FIGS. 15-17. Although the sealing ring 400 is referred to as such, it is to be understood that the sealing ring 400 need not embody a circular shape. In fact, in the desirable embodiment, the sealing ring 400 is substantially rectilinear in shape. The sealing ring 400 is embodied as a frame bounded by substantially straight edges, such as four legs 402. In the desirable embodiment, the sealing ring 400 is embodied as a substantially rectangular frame arrangement, however, it is to be understood that other geometric shapes including, but not limited to triangular and trapezoidal, may be embodied in alternative embodiments of the present invention.

Figure 18:
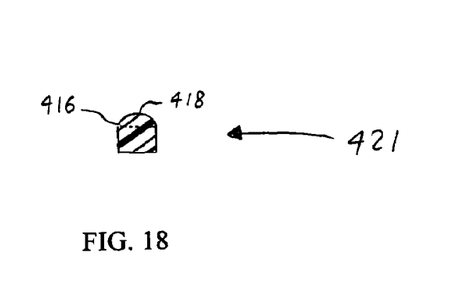
FIG. 18 is a sectional view of a seal according to an alternative embodiment of the present invention.

In the desirable embodiment, all but one of the sides of each respective leg 402 is substantially flat. Thus, unlike an O-ring, which is circular in shape and has a circular cross section, the sealing ring 400 has a substantially square or rectangular cross section. For example, as shown in FIG. 17, three sides 410, 412, and 414 are substantially flat, whereas a fourth side 416 has a substantially arcuate-shaped or curved cross section. Thus, in the desirable embodiment, a raised portion 418 extends from the fourth side 416. As the raised portion 418 occupies only a section (e.g., a substantially central portion) of the fourth side 416, an inner and outer ledge 420 is formed on the fourth side 416. In an alternative embodiment sealing ring 421, as shown in cross section in FIG. 18, the raised portion 418 may extend fully across the fourth side 416 (shown in phantom) such that no ledge or ledges 420 is formed. As shown in FIG. 16, the sealing ring includes a planar surface 422 and a curved surface 424. The planar surface 422 is defined by the side 412 of each of the legs 402. The curved surface 424 is formed by the raised portion 418 extending continuously along the fourth side of each of the legs 402. Thus, the planar surface 422 is substantially parallel to the curved surface 424. Desirably, the sealing ring is approximately 1.32 inches long, approximately 0.86 inches wide, and approximately 0.65 inches in depth. Each side 410, 412, and 414, exclusive of the raised portion 418 is approximately 0.45 inches tall. Although the desirable embodiment discussed herein discloses curved outer edges where two substantially perpendicular legs 402 meet, it is to be understood that square edges or other suitable edge forms may be substituted. It is to be understood that the raised portion 418 may be integral to each of the legs 402 or may be attached along the legs 402 after molding thereof. Desirably, the sealing ring 400 is constructed of an elastomeric material, such as Natural Buna Rubber (NBR) or Ethylene Propylene (EP), however, it is to be understood that other suitable materials may be utilized.

Figure 19:
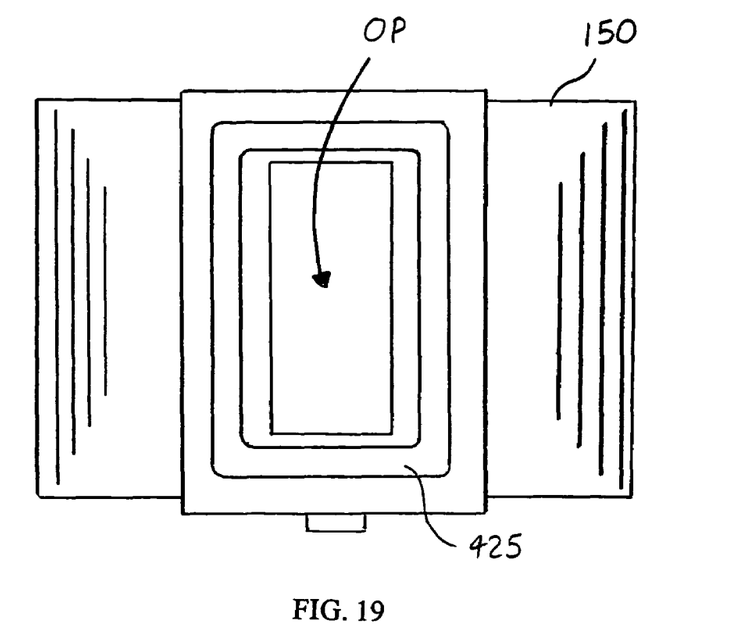
FIG. 19 is a front plan view of a measuring chamber having a channel defined around an outlet port.
Figure 20:
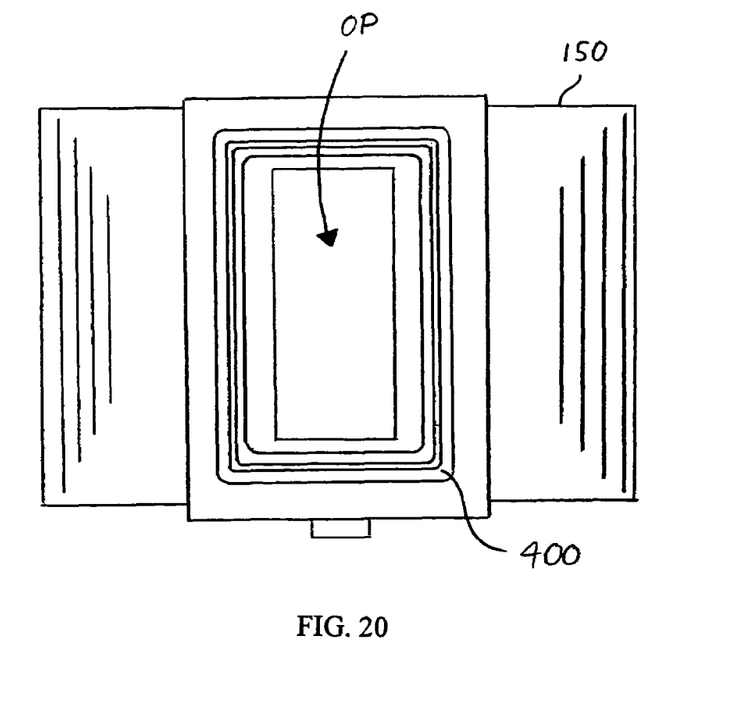
FIG. 20 is a front plan view of the measuring chamber having the seal situated within the channel.

With continuing reference to FIGS. 15-17, the measuring chamber 150 having an outlet port OP defined therein, is shown in FIGS. 19-20. A channel 425 is defined around the outlet port OP. The channel 425 is substantially rectangular in shape to accommodate the correspondingly-sized sealing ring 400 therein, as shown in FIG. 20. It is to be understood that the channel 425 is sized to securely accommodate a correspondingly-sized sealing ring of any suitable dimension. The channel 425 may be manufactured such that sides thereof are parallel to each other and perpendicular to a bottom portion of the channel 425.

Figure 21:
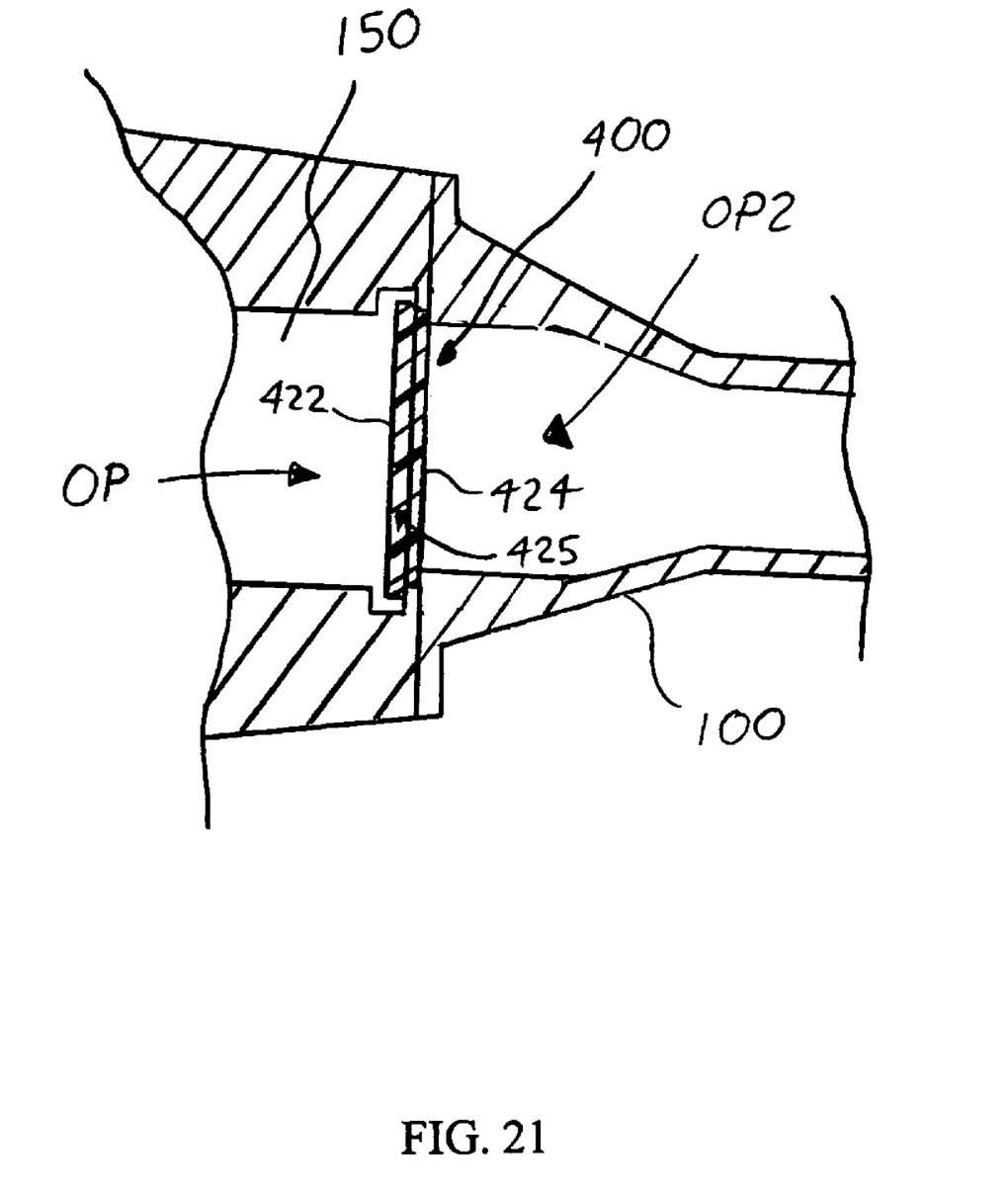
FIG. 21 is a partial sectional view of the measuring chamber and the meter casing having the seal situated therebetween.

With reference to FIG. 21, a partial sectional view of the measuring chamber 150 and the meter casing 100 having the sealing ring 400 situated therebetween is shown. Generally, in the desirable embodiment, the planar surface 422 is situated within the channel 425 such that the curved surface 424 extends out of the channel 425. Desirably, the depth of the channel 425 substantially corresponds to the height of the sides 410, 412, and 414 of the sealing ring 400. To effect the goal of preventing the sealing ring 400 from dislodging during the assembly of the meter M, the seal extends substantially at least 0.45 inches into the channel 425. Accordingly, the height of the sides 410, 412, and 414 and the corresponding depth of the channel 425 is also substantially at least 0.45 inches. The depth of the channel 425 is essentially a minimum of half of the width of the channel 425, however, it is to be understood, that any other ratio may be utilized that is conducive to preventing dislodging of the sealing ring 400. During formation of the channel 425, the channel sides may be caved in toward each other to assist in preventing dislodging of the sealing ring 400.

The outlet port OP of the measuring chamber 150 is substantially aligned with an outlet port OP2 of the meter casing 100. Accordingly, the curved surface 424 of the sealing ring 400 abuts a periphery of the outlet port OP2 of the meter casing 100 forming a seal therewith. The design of the sealing ring 400 in connection with its placement in the channel 425, prevents the sealing ring 400 from becoming loose and dislodged during assembly of the meter M. Specifically, the curved cross section of the raised portion 418 is less conducive to providing friction or contact surfaces that would ordinarily allow items that brush up against the sealing ring 400 to dislodge it. Accordingly, the measuring chamber 150 may be distributed and handled with the sealing ring 400 in place without concern that the sealing ring 400 may become dislodged during shipping or assembly of the meter M. It is to be understood that the sealing ring 400 and derivatives thereof may be utilized in other existing or future water meters.

The invention has been described with reference to the desirable embodiments. Modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A positive displacement water meter comprising:
    a measuring chamber having an outlet port defined therein, wherein the outlet port includes a channel defined around the outlet port;
    a seal having a planar surface and a curved surface, wherein the planar surface is substantially parallel to the curved surface, and the planar surface is situated within the channel;
    a meter casing having an outlet port defined therein, wherein the meter casing receives the measuring chamber therein such that the outlet port of the measuring chamber is substantially aligned with the outlet port of the meter casing, wherein the curved surface of the seal abuts an inner surface of the meter casing having the outlet port and forming a seal therewith.

2. The positive displacement water meter of claim 1, wherein the curved surface is a raised portion extending from the seal, and wherein the raised portion has a substantially arcuate-shaped cross section, whereby the seal is adapted to resist the dislodging thereof from the channel during assembly of the positive displacement water meter.

3. The positive displacement water meter of claim 2, wherein the seal includes three or more legs formed as a geometric frame arrangement, and wherein each leg includes a first, second, third, and fourth side.

4. The positive displacement water meter of claim 3, wherein the geometric frame arrangement is substantially rectangular.

5. The positive displacement water meter of claim 4, wherein the raised portion is situated in a substantially central portion of the fourth side of each respective leg to form a ledge thereon.

6. The positive displacement water meter of claim 4, wherein the seal is constructed of an elastomeric material.

7. The positive displacement water meter of claim 3, wherein the first, second, and third sides of each respective leg are substantially flat, and wherein the raised portion extends continuously along the fourth side of each respective leg.

8. The positive displacement water meter of claim 2, wherein the raised portion extends out of the channel.

9. The positive displacement water meter of claim 8, wherein the depth of the channel is essentially a minimum of half of the width of the channel.

10. The positive displacement water meter of claim 1, wherein the channel has sides that are angled toward each other so as to give the channel a trapezoidal shape.

11. positive displacement water meter of claim 1, wherein the curved surface of the seal enables flexing of the seal in a radial direction of the seal and compression of the seal in an axial direction of the seal.

* * * * *

UNITED STATES PATENT AND TRADEMARK OFFICE
CERTIFICATE OF CORRECTION

PATENT NO. : 7,493,811 B2 Page 1 of 1
APPLICATION NO. : 11/328740
DATED : February 24, 2009
INVENTOR(S) : Koch et al.

It is certified that error appears in the above-identified patent and that said Letters Patent is hereby corrected as shown below:

Column 6, Line 30, Claim 11, "positive" should read -- The positive --

Signed and Sealed this

Sixteenth Day of June, 2009

JOHN DOLL
*Acting Director of the United States Patent and Trademark Office*